(12) United States Patent
Aten

(10) Patent No.: US 7,247,690 B2
(45) Date of Patent: Jul. 24, 2007

(54) MELT-FABRICABLE TETRAFLUOROETHYLENE/FLUORINATED VINYL ETHER COPOLYMER PREPARED BY SUSPENSION POLYMERIZATION

(75) Inventor: Ralph Munson Aten, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/818,429

(22) Filed: Apr. 5, 2004

(65) Prior Publication Data

US 2004/0214974 A1 Oct. 28, 2004

Related U.S. Application Data

(60) Provisional application No. 60/463,475, filed on Apr. 17, 2003.

(51) Int. Cl.
*C08F 116/12* (2006.01)
(52) U.S. Cl. .................. 526/247; 526/88; 526/242; 526/250
(58) Field of Classification Search ............... 526/247, 526/242, 88, 250
See application file for complete search history.

(56) References Cited

U.S. PATENT DOCUMENTS

| | | | |
|---|---|---|---|
| 2,559,752 A | 7/1951 | Berry | |
| 2,952,669 A | 9/1960 | Bro | |
| 3,132,123 A | 5/1964 | Harris et al. | |
| 3,245,972 A | 4/1966 | Anderson et al. | |
| 3,635,926 A | 1/1972 | Vogelpohl | |
| 3,642,742 A | 2/1972 | Carlson | |
| 4,078,134 A * | 3/1978 | Kuhls et al. | 526/204 |
| 4,380,618 A * | 4/1983 | Khan et al. | 526/206 |
| 4,499,249 A | 2/1985 | Nakagawa et al. | |
| 5,405,923 A | 4/1995 | Aten | |
| 5,461,129 A * | 10/1995 | Kurihara et al. | 526/247 |
| 5,763,082 A * | 6/1998 | Kokumai et al. | 428/402 |
| 5,932,673 A * | 8/1999 | Aten et al. | 526/247 |
| 6,013,719 A | 1/2000 | Lahijani | |
| 6,136,933 A * | 10/2000 | Jones | 526/255 |
| 6,841,594 B2 * | 1/2005 | Jones et al. | 523/201 |

FOREIGN PATENT DOCUMENTS

| | | |
|---|---|---|
| WO | WO 03/093333 A1 | 11/2003 |
| WO | WO-03/093333 A1 * | 11/2003 |
| WO | WO 2004/050727 A1 | 6/2004 |
| WO | WO-2004/094492 A1 * | 11/2004 |

* cited by examiner

*Primary Examiner*—David W. Wu
*Assistant Examiner*—Henry S. Hu

(57) ABSTRACT

Melt-fabricable, tough copolymer of tetrafluoroethylene and fluorinated vinyl ether is produced in a suspension polymerization process by copolymerizing tetrafluoroethylene and fluorinated vinyl ether in a pressurized, agitated reaction vessel which contains aqueous medium, free radical initiator, and a telogen, the aqueous medium being essentially free of fluorine containing organic solvent. The contents of the reaction vessel are agitated during polymerization sufficiently to coagulate copolymer of tetrafluoroethylene and fluorinated vinyl ether. The melt-fabricable, tough copolymer having a melt viscosity of less than about $1\times10^6$ Pa·S is isolated directly from the reaction vessel.

23 Claims, No Drawings

MELT-FABRICABLE TETRAFLUOROETHYLENE/FLUORINATED VINYL ETHER COPOLYMER PREPARED BY SUSPENSION POLYMERIZATION

FIELD OF THE INVENTION

This invention relates to an improved process for preparing melt-fabricable tetrafluoroethylene/fluorinated vinyl ether copolymer.

BACKGROUND OF THE INVENTION

Polymers prepared from fluorinated monomers such as tetrafluoroethylene (TFE) have outstanding physical properties including toughness, chemical and heat resistance, corrosion protection, release, cleanability, low flammability, and weatherability. High molecular weight polytetrafluoroethylene (PTFE) homopolymers provide the highest heat stability among the fluoropolymers but have an extremely low melt flow making fabrication of these polymers difficult. It is known that the melt flow of TFE polymers can be increased by copolymerization with ethylenically unsaturated monomers creating plastics with high enough flow to allow fabrication by melt extrusion or injection molding.

U.S. Pat. No. 2,559,752 to Berry and U.S. Pat. No. 2,952,669 to Bro both disclose polymerization of TFE with ethylenically unsaturated comonomer to make tough polymer which can be hot pressed into transparent film which can be bent 180° without breaking. The polymerization may be carried out in an aqueous dispersion polymerization process using a fluorosurfactant as taught by Berry or in a fluorinated nonaqueous liquid solvent medium as taught by Bro. In U.S. Pat. No. 3,132,123, Harris, Jr. et al. disclose the copolymerization of TFE specifically with perfluoro(alkyl vinyl ether) (PAVE) in a fluorinated solvent to produce melt-processable polymers with sufficient melt flow to permit melt fabrication of useful end products.

In further development of TFE copolymerization, U.S. Pat. No. 3,642,742 to Carlson and U.S. Pat. No. 3,635,926 to Gresham et al. disclose the benefit of using chain transfer agent (CTA) in polymerizing melt processible TFE/PAVE copolymers. Use of a chain transfer agent imparts two highly desirable secondary attributes without decreasing the ease of melt processibility, namely (1) decreased unstable end groups for increased thermal stability and (2) narrowed molecular weight distribution leading to reduced swelling upon extrusion. Carlson conducts the copolymerization in fluorosolvent and Gresham conducts an aqueous dispersion polymerization with fluorosurfactant to produce a colloidally stable dispersion of TFE/PAVE copolymers.

Two general processes for polymerizing tetrafluoroethylene (TFE) to make non-melt processible polytetrafluoroethylene (PTFE) are known—(1) dispersion polymerization and (2) suspension polymerization. Aqueous suspension polymerization has the advantages of using little or no surfactant (dispersing agent), no organic solvents, and the ability to directly isolate the polymer from aqueous medium. All of this is in contrast to dispersion polymerization which uses large amounts of surfactant incurring added expense and requiring recycle and/or disposal. Further, dispersion polymerization requires subsequent steps such as coagulation and washing to achieve isolation of the product.

An effort to produce tetrafluoroethylene/fluoro(alkyl vinyl ether) copolymer by suspension polymerization is described in U.S. Pat. No. 4,499,249 to Nakagawa et al. However, the medium used is a mixed medium of water and a fluorohydrocarbon or a chlorofluorohydrocarbon.

What would be desirable is an improved process for producing tetrafluoroethylene copolymer that eliminates or minimizes the use of surfactants and solvents and permits easy isolation of a copolymer product.

BRIEF SUMMARY OF THE INVENTION

The invention provides a process for producing a melt-fabricable, tough copolymer of tetrafluoroethylene and fluorinated vinyl ether in a suspension polymerization process by copolymerizing tetrafluoroethylene and fluorinated vinyl ether in a pressurized, agitated reaction vessel which contains aqueous medium, free radical initiator, and a telogen, the aqueous medium being essentially free of fluorine containing organic solvent. The contents of the reaction vessel are agitated during polymerization sufficiently to coagulate copolymer of tetrafluoroethylene and fluorinated vinyl ether. The melt-fabricable, tough copolymer having a melt viscosity of less than about $1 \times 10^6$ Pa·S is isolated directly from the reaction vessel.

In preferred embodiments of the invention, the process is conducted so that the contents of the reaction vessel are free of surfactant; the telogen comprises a non-fluorine-containing organic compound; and the agitation of the reaction vessel is sufficient to coagulate greater than about 90% by weight of the melt-fabricable, tough copolymer of tetrafluoroethylene and fluorinated vinyl ether made in the polymerization.

DETAILED DESCRIPTION OF THE INVENTION

The invention relates to producing a melt-fabricable, tough copolymer of tetrafluoroethylene (TFE) and fluorinated vinyl ether (FVE) using a suspension polymerization process. The term "copolymer", for purposes of this invention, is intended to encompass polymers comprising repeat units derived from two or more comonomers in a single polymer.

The term melt-fabricable is used to characterize the copolymer produced and differentiates such polymers from polymers that are considered to be melt-flowable, such as low melt viscosity PTFE, often referred to as micropowder. As taught in U.S. Pat. No. 6,013,719 to Lahijani, low melt viscosity (MV) PTFE has the thermal stability, chemical inertness, lubricity, and high melting temperature similar to high MV PTFE. The much lower MV of this PTFE makes the PTFE melt-flowable, but the much lower molecular weight of this PTFE deprives it of strength, whereby articles molded from this low MV PTFE by melt extrusion break upon handling. For example, the beading extruded in the MV determination (ASTM D1238-527) breaks upon the slightest flexing, and tensile testing samples formed by injection molding break upon mere clamping in the tensile testing machine, whereby the resin has no measurable tensile strength. Thus, although melt-flowable, the low MV PTFE is not melt-fabricable, relegating micropowder to uses such as additives in liquid lubricants and in coatings applied to supporting substrates.

Thus, by melt-fabricable, it is meant that the polymer can be both extruded through a capillary tube as described in ASTM D1238-527 and has enough toughness and integrity to be fabricated into an article such as a film or thin walled tube.

A tough polymer is defined as a polymer which can be molded into a thin film and can be bent 180° without breaking. The two principle properties in this invention which contribute to toughness are (1) fluorinated vinyl ether content and (2) the melt viscosity of the polymer.

The process preferably employs fluorinated vinyl ether in an amount sufficient to produce melt-fabricable, tough copolymer of tetrafluoroethylene and fluorinated vinyl ether containing from about 1 to about 20 weight % of fluorinated vinyl ether, more preferably from about 3 to about 20 weight % fluorinated vinyl ether, even more preferably from about 3 to about 15 weight % fluorinated vinyl ether, and most preferably from about 3 to about 10 weight % fluorinated vinyl ether, weight % being based on the weight of the total polymer.

The copolymer produced has a melt viscosity of less than about $1 \times 10^6$ Pa·S, preferably about $1 \times 10^2$ Pa·S to about $1 \times 10^6$ Pa·S, more preferably about $5 \times 10^2$ Pa·S to about $5 \times 10^4$ Pa·S, and most preferably about $1 \times 10^3$ Pa·S to about $3.5 \times 10^4$ Pa·S.

The fluorinated vinyl ether comonomer is preferably perfluoro(alkyl vinyl ether) (PAVE) and the alkyl group contains 1 to 6 carbon atoms. The PAVE can be, for example, perfluoro(methyl vinyl ether) (PMVE), perfluoro(ethyl vinyl ether) (PEVE) or perfluoro(propyl vinyl ether) (PPVE). More than one fluorinated vinyl ether can be used if desired, for example, PMVE and PPVE.

In a more preferred form of the invention, the process employs in addition to FVE, a fluoroolefin in an amount sufficient to produce melt-fabricable, tough copolymer of TFE and FVE containing up to 5 weight % fluoroolefin comonomer units. In the most preferred form of the invention the fluoroolefin is hexafluoropropylene.

The process of this invention can be carried out similarly to TFE suspension polymerizations known in the art for high molecular weight PTFE, involving the steps of precharging water to a stirred reaction vessel, deoxygenating, pressuring with TFE to a predetermined pressure, adding fluorinated vinyl ether (FVE) and fluoroolefin comonomer if used, and adding free radical initiator at a sufficient concentration to start and to maintain the polymerization reaction. For this invention, telogen is also added, preferably to the precharge. In addition for this invention, the aqueous medium is essentially free of fluorine-containing organic solvent. TFE is introduced into the reaction vessel on a predetermined basis as the polymerization proceeds, for example to maintain a specified pressure or at a specified feed rate. It is advantageous in some polymerizations to add additional fluorinated vinyl ether (and fluoroolefin comonomer if used) to the reaction vessel as the polymerization proceeds.

Any workable pressure can be used in the process of this invention. High pressure offers an advantage over low pressure in increased reaction rate. Low pressure offers an advantage over higher pressure in increased comonomer incorporation. Generally, pressures in the range of about 0.3 to 7 MPa are used, and pressures in the range of 0.7 to 3.5 MPa are preferred. Pressures in the range of 0.7 to 2.5 MPa are more preferred, and pressures in the range of 0.7 to 1.9 MPa are especially preferred.

Polymerization temperatures known for use in the suspension polymerization of TFE may also be used for the practice of the present invention. Choice of temperature is generally determined by temperature dependence of initiator. Generally, the co-polymerization in accordance with the invention is carried out at a temperature of about 0° C. to about 100° C., more preferably about 10° C. to about 90° C., most preferably about 15° C. to about 75° C.

Similar to a standard suspension polymerization process such as that described in U.S. Pat. No. 3,245,972 to Anderson et al., it is believed that in the process of the invention TFE and fluorinated vinyl ether comonomer dissolves in the water and polymerizes to form tiny solid water-wet nuclei. When the water-wet nuclei have increased sufficiently in size, they are coagulated by the agitation applied to the aqueous medium to form agglomerated non-water-wet particles. Further polymerization is believed to take place largely on the surface of the agglomerated non-water-wet particles at an increased rate, apparently via direct contact of gaseous monomer with the non-water-wet agglomerates in preference to contact with dissolved monomer with water-wet particles. However, significant differences from standard suspension polymerization, in addition to the use of fluorinated vinyl ether comonomer, include the addition of increased amounts of initiator as well as the addition of telogen to achieve melt-fabricable copolymer.

As in the suspension polymerization of high molecular weight PTFE, the reaction vessel in this polymerization process is agitated sufficiently to coagulate the tetrafluoroethylene copolymer. In a preferred embodiment, the agitator is operated in a range of about 300 to about 800 rpm such as described in U.S. Pat. No. 5,405,923 to Aten. Because the polymer coagulates during polymerization, isolation can be performed directly from aqueous medium such as by draining the aqueous medium from the resulting polymer and drying. All of this is in contrast to dispersion polymerization which product requires subsequent steps such as coagulation and washing to achieve isolation.

In a preferred embodiment of the invention, agitation is sufficient to cause coagulation of greater than about 90% by weight of melt-fabricable TFE copolymer, more preferably greater than about 95%, and most preferably greater than about 98%. Generally in embodiments of the invention, the agitation is sufficient to cause coagulation of greater than about 90% by weight to about 100% by weight of melt-fabricable TFE copolymer. In the Examples of the invention which follow, it will be shown that the amount of solids remaining in the liquid phase is generally less than 2.0% by weight and frequently less than 1.0% by weight.

The suspension polymerization process is conducted in the presence of telogen, also known as chain transfer agent (CTA), which lowers the molecular weight of the polymer. It is believed that the mechanism consists of extraction of a hydrogen or other readily extractable radical group from the telogen by a growing chain polymer radical which results in termination of the growing polymer chain. The telogen molecule itself is left as a radical, thus the commonly used phrase "chain transfer". The telogen used in the process of the present invention is preferably a non-fluorine-containing organic compound. The telogen can be defined as "active" in that the reaction requires relatively small amounts to achieve successful polymerization of the low molecular weight polymer. When polymerization is carried out by precharging a tetrafluoroethylene, fluorinated vinyl ether and telogen precharge to the reaction vessel and introducing additional tetrafluoroethylene as the polymerization proceeds, the telogen is preferably present in the precharge in a concentration of only about 0.1 mole % to about 20 mole %, more preferably about 0.5 mole % to about 10 mole %, and most preferably about 0.5 mole % to about 5 mole % based upon total tetrafluoroethylene and telogen present in the precharge.

In a more preferred embodiment of this invention, the telogen is an aliphatic hydrocarbon containing 1 to 6 carbon atoms. An example of a preferred telogen is ethane.

The suspension polymerization process of this invention is conducted in a single liquid phase, i.e., aqueous medium being essentially free of fluorine containing organic solvent. Water is a convenient, liquid over a broad temperature range, inexpensive and safe.

In this reaction process for the production of the copolymer of this invention, a greater concentration of initiator is employed than normally used for the standard polymerization of high molecular weight granular PTFE. Increased initiator concentration aids in reducing the molecular weight and maintaining polymerization rate. The amount of initiator depends on the polymerization temperature and the initiator type but the amount used for our invention may be 10-500 times that used to achieve high molecular weight granular PTFE. Initiators that can be used in the practice of this invention include any free radical initiator for TFE polymerization that is effective over the temperature range to be employed. Initiators commonly employed in aqueous polymerization are thermally activated water-soluble free radical initiators such as ammonium persulfate (APS), potassium persulfate (KPS), or combinations thereof, or chemically activated redox systems such as potassium permanganate/oxalic acid/potassium bisulfite, potassium persulfate/potassium bisulfite/iron sulfate, or potassium bromate/potassium bisulfite/oxalic acid and the like.

The process of the present invention is preferably carried out so that the contents of the reaction vessel are essentially free of surfactant, i.e., the amount of surfactant is less than about 0.010 weight % based on the amount of water present. Preferred processes in accordance with the invention minimize or eliminate the use of fluorosurfactants normally used in dispersion polymerizations which adds to the expense of required recycle and/or disposal after polymerization.

The polymers produced by the process of the invention may be fabricated by standard plastics processing methods such as extrusion, injection molding, rotomolding and rotolining. The polymers may be made into fabricated articles such as films, sheets and fibers. The polymers can be used as valve, pipe, and tank liners. They can be extruded through small orifices into tubing and are suitable for wire coating. They may be molded into articles such as trays, racks, and vessels.

TEST METHODS

Melt viscosity measured by extrusion through a capillary orifice (capillary or extrusion viscosity) is determined at 372° C. by ASTM method D1238-52T modified as described in U.S. Pat. No. 4,380,618.

Fluoropolymer composition is determined by using Fourier transform infrared (FTIR) spectroscopy on 0.095-0.105 mm thick films pressed at 380° C. The FTIR absorption band to 4.25 µm is used as an internal thickness standard. PPVE content is determined from the FTIR band at 10.1 µm and is calculated in wt % as 0.97× the ratio of the 10.1 µm absorbance to the 4.25 µm absorbance. PEVE content is determined from the FTIR band at 9.18 µm and is calculated in wt % as 0.75 plus 1.28× the ratio of the 9.18 µm absorbance to the 4.25 µm absorbance. PMVE content is determined from the FTIR band at 11.2 µm and is calculated in wt % as 7× the ratio of the 11.2 µm absorbance to the 4.25 µm absorbance.

Tough Polymer is determined by the bend test. Polymer is hot pressed into a transparent film 5 cm×5 cm having a thickness of from about 2 mil (50 µm) to about 10 mils (250 µm). The film is folded in half, i.e., flexed 180°, just as if one were folding a piece of paper. A polymer is considered tough if it can be bent without breaking.

EXAMPLES

Example 1

The polymerization is conducted in a 37.9-liter stainless steel autoclave encased in a jacket through which heat transfer fluid is circulated for heating or cooling purposes. This autoclave is equipped with a two-bladed, 45-degree angled, flat downdraft agitator mounted on a vertical shaft. Pressure is reported on an absolute basis.

The autoclave is charged with 21.3 L of demineralized water and 1 g of citric acid. After oxygen removal, 300 g of perfluoro(ethyl vinyl ether), PEVE, is charged through the stopcock. The autoclave is cooled to 25° C. and ethane is introduced to give a pressure rise of 3.4 kPa. The autoclave is pressured to 1.83 MPa with TFE at 65° C. A total of 27 g of APS is injected as initiator. After kickoff, the TFE feed valve is opened, and additional TFE monomer is continuously fed into the autoclave to maintain the pressure at 1.83 MPa during the subsequent course of the reaction. A solution of APS is continuously injected at a rate which deliveries to the autoclave 0.225 g APS per minute for 80 minutes. At the same time, additional PEVE is injected into the autoclave at a rate of 4.5 g/min for 80 minutes, for a total of 360 g of PEVE added after kickoff. During the course of the reaction, the temperature is maintained at 65° C. After 100 min of reaction measured from kickoff, 2449 g of TFE has been converted into polymer. At this point the TFE feed valve is closed and the excess monomer is vented from the autoclave. The polymer is isolated directly from the reaction vessel by draining off the aqueous medium leaving wet polymer in granular form. Wet product of polymerization is finished by drying in a circulating air oven for 24-48 hr at about 150° C.

The resulting polymer has a comonomer content of 7.09 weight percent PEVE, and a melt viscosity of $3.1 \times 10^3$ Pa·S as measured by capillary extrusion. The polymer solids left in aqueous phase after isolation is 0.58 weight % based on the aqueous phase. The resulting copolymer is capable of passing the bend test without breaking.

Examples 2-13

The procedure of Example 1 is repeated for Examples 2-13 with the process conditions and resulting copolymers being described in Table 1. All resulting copolymers are capable of passing the bend test without breaking.

TABLE 1

| Example | Comonomer type | Comonomer precharge, g | Initiator precharge, g | Ethane precharge, kPa | Comonomer second charge, g | Comonomer second charge time, min | Initiator addition rate, g/min | TFE consumed, g | Comonomer content, wt % | Melt viscosity, $10^3$ PaS | Polymer Left in Aq. Phase wt % |
|---|---|---|---|---|---|---|---|---|---|---|---|
| 2 | PEVE | 300 | 27 | 20.3 | 180 | 40 | 0.225 | 4899 | 5.24 | 2.1 | 0.60 |
| 3 | PEVE | 300 | 27 | 13.5 | 180 | 40 | 0.225 | 5443 | 5.37 | 2.8 | 0.63 |

TABLE 1-continued

| Example | Comonomer type | Comonomer precharge, g | Initiator precharge, g | Ethane precharge, kPa | Comonomer second charge, g | Comonomer second charge time, min | Initiator addition rate, g/min | TFE consumed, g | Comonomer content, wt % | Melt viscosity, $10^3$ PaS | Polymer Left in Aq. Phase wt % |
|---|---|---|---|---|---|---|---|---|---|---|---|
| 4 | PPVE | 300 | 27 | 20.3 | 180 | 40 | 0.225 | 3583 | 4.17 | 4.7 | 0.59 |
| 5 | PPVE | 300 | 27 | 20.3 | 180 | 40 | 0.225 | 3221 | 3.85 | 4.5 | 0.62 |
| 6 | PPVE | 300 | 21 | 20.3 | 180 | 40 | 0.175 | 2404 | 3.64 | 4.2 | 0.52 |
| 7 | PPVE | 450 | 27 | 27.1 | 0 | 0 | 0.225 | 3901 | 4.25 | 5.1 | 0.63 |
| 8 | PPVE | 600 | 27 | 20.3 | 0 | 0 | 0.225 | 3266 | 4.38 | 4.5 | 0.70 |
| 9 | PPVE | 300 | 27 | 13.5 | 180 | 40 | 0.225 | 4763 | 3.24 | 25.0 | 0.53 |
| 10 | PEVE | 300 | 27 | 13.5 | 180 | 40 | 0.225 | 5443 | 4.75 | 3.4 | 0.53 |
| 11 | PMVE | 300 | 27 | 13.5 | 180 | 40 | 0.225 | 1902 | 5.38 | 1.4 | 0.70 |
| 12 | PMVE | 300 | 27 | 13.5 | 180 | 40 | 0.225 | 907 | 5.41 | 12.1 | 0.50 |
| 13 | PMVE | 300 | 27 | 13.5 | 180 | 40 | 0.225 | 1814 | 5.32 | 63.4 | 0.66 |

What is claimed is:

1. A process for producing a melt-fabricable, tough copolymer of tetrafluoroethylene and fluorinated vinyl ether in a suspension polymerization process comprising:

copolymerizing tetrafluoroethylene and fluorinated vinyl ether in a pressurized, agitated reaction vessel which contains aqueous medium, water-soluble free radical initiator, and a telogen, said aqueous medium being essentially free of fluorine containing organic solvent, said process employing fluorinated vinyl ether in an amount sufficient to produce melt-fabricable tough copolymer of tetrafluoroethylene and fluorinated vinyl ether containing from about 1 to about 20 weight % fluorinated vinyl ether;

agitating the contents of said reaction vessel during said copolymerizing to coagulate copolymer of tetrafluoroethylene and fluorinated vinyl ether; and isolating said melt-fabricable, tough copolymer having a melt viscosity of less than about $1 \times 10^6$ Pa·S directly from said reaction vessel.

2. The process of claim 1 wherein said process employs fluorinated vinyl ether in an amount sufficient to produce melt-fabricable tough copolymer of tetrafluoroethylene and fluorinated vinyl ether containing from about 3 to about 20 weight % fluorinated vinyl ether.

3. The process of claim 1 wherein said process employs fluorinated vinyl ether in an amount sufficient to produce melt-fabricable tough copolymer of tetrafluoroethylene and fluorinated vinyl ether containing from about 3 to about 15 weight % fluorinated vinyl ether.

4. The process of claim 1 wherein said process employs fluorinated vinyl ether in an amount sufficient to produce melt-fabricable tough copolymer of tetrafluoroethylene and fluorinated vinyl ether containing from about 3 to about 10 weight % fluorinated vinyl ether.

5. The process of claim 1 further comprising employing a fluoroolefin comonomer in an amount sufficient to produce melt-fabricable tough copolymer of tetrafluoroethylene and fluorinated vinyl ether containing up to 5 weight % of a fluoroolefin comonomer units.

6. The process of claim 5 wherein said fluoroolefin is hexafluoropropylene.

7. The process of claim 1 wherein said contents of said reaction vessel comprise less than 0.010 weight % surfactant based on the amount of water present.

8. The process of claim 1 wherein said telogen comprises a non-fluorine-containing organic compound.

9. The process of claim 1 wherein said telogen is an aliphatic hydrocarbon containing 1 to 6 carbon atoms.

10. The process of claim 1 wherein said melt-fabricable tough copolymer of tetrafluoroethylene and fluorinated vinyl ether has a melt viscosity in the range of about $1 \times 10^2$ Pa·S to about $1 \times 10^6$ Pa·S.

11. The process of claim 1 wherein said melt-fabricable tough copolymer of tetrafluoroethylene and fluorinated vinyl ether has a melt viscosity in the range of about $5 \times 10^2$ Pa·S to about $5 \times 10^4$ Pa·S.

12. The process of claim 1 wherein said melt-fabricable tough copolymer of tetrafluoroethylene and fluorinated vinyl ether has a melt viscosity in the range of about $1 \times 10^2$ Pa·S to about $3.5 \times 10^4$ Pa·S.

13. The process of claim 1 wherein said agitation of said contents of said reaction vessel is sufficient to coagulate greater than about 90% by weight of said melt-fabricable tough copolymer of tetrafluoroethylene and fluorinated vinyl ether.

14. The process of claim 1 wherein said agitation of said contents of said reaction vessel is sufficient to coagulate greater than about 95% by weight of said melt-fabricable tough copolymer of tetrafluoroethylene and fluorinated vinyl ether.

15. The process of claim 1 wherein said agitation of said contents of said reaction vessel is sufficient to coagulate greater than about 98% by weight of said melt-fabricable tough copolymer of tetrafluoroethylene and fluorinated vinyl ether.

16. The process of claim 1 wherein said copolymerizing is carried out by providing a precharge comprising tetrafluoroethylene, fluorinated vinyl ether and telogen in said reaction vessel and introducing additional tetrafluoroethylene to said reaction vessel as said polymerizing proceeds, said telogen being present in a concentration of about 0.1 mole % to about 20 mole % based upon total tetrafluoroethylene and telogen present in said precharge.

17. The process of claim 16 wherein additional fluorinated vinyl ether is added to the reaction vessel as said copolymerizing proceeds.

18. The process of claim 1 wherein said fluorinated vinyl ether is perfluoro(alkyl vinyl ether) and the alkyl group contains 1 to 6 carbon atoms.

19. The process of claim 18 wherein said perfluoro(alkyl vinyl ether) is perfluoro(propyl vinyl ether).

20. The process of claim 18 wherein said perfluoro(alkyl vinyl ether) is perfluoro(ethyl vinyl ether).

21. The process of claim 18 wherein said perfluoro(alkyl vinyl ether) is perfluoro(methyl vinyl ether).

22. The process of claim 18 wherein said perfluoro (alkyl vinyl ether) is perfluoro(methyl vinyl ether) and perfluoro (propyl vinyl ether).

23. The process of claim 1 wherein at least some of said fluorinated vinyl ether is added to said reaction vessel as said copolymerizing proceeds.

* * * * *